March 18, 1958     H. F. FLOWERS     2,826,999
DUMP VEHICLE INTERLOCKING DOOR MECHANISM
Filed June 4, 1954     6 Sheets-Sheet 1

INVENTOR.
HENRY FORT FLOWERS
BY
ATTYS.

March 18, 1958 — H. F. FLOWERS — 2,826,999
DUMP VEHICLE INTERLOCKING DOOR MECHANISM
Filed June 4, 1954 — 6 Sheets-Sheet 2

INVENTOR.
HENRY FORT FLOWERS
BY
Mason, Porter, Diller T. Stewart
ATTYS

March 18, 1958  H. F. FLOWERS  2,826,999
DUMP VEHICLE INTERLOCKING DOOR MECHANISM
Filed June 4, 1954  6 Sheets-Sheet 3
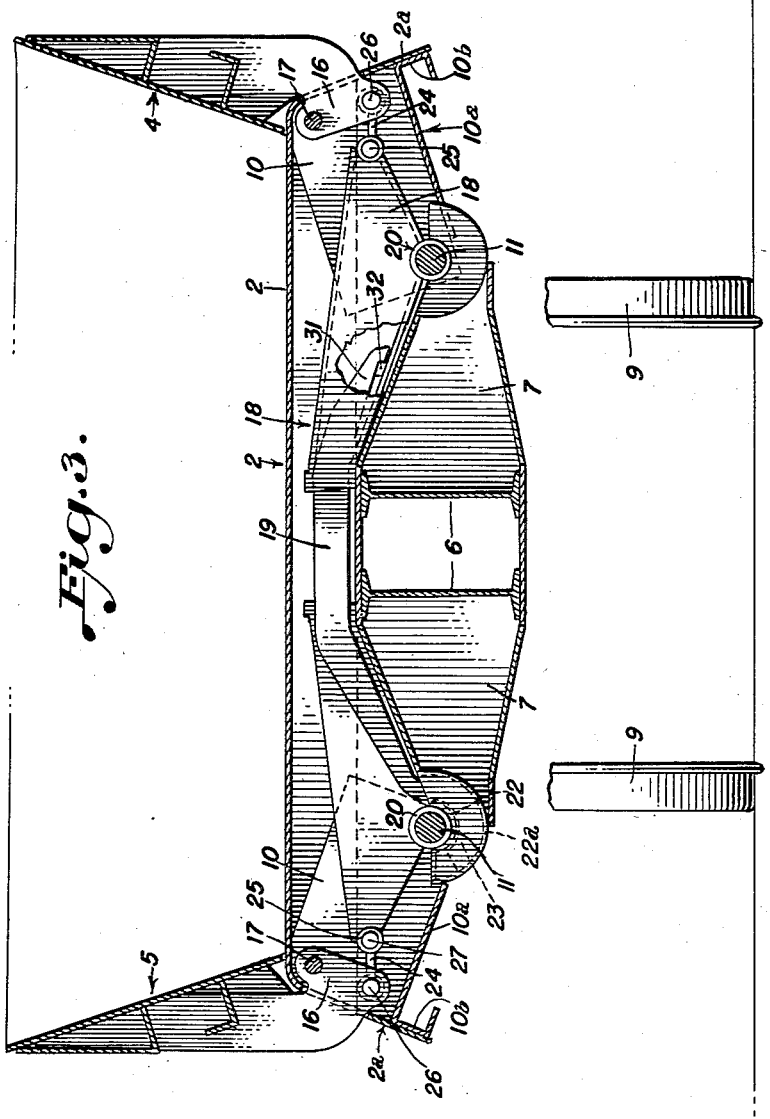
INVENTOR.
HENRY FORT FLOWERS
BY
ATTYS.

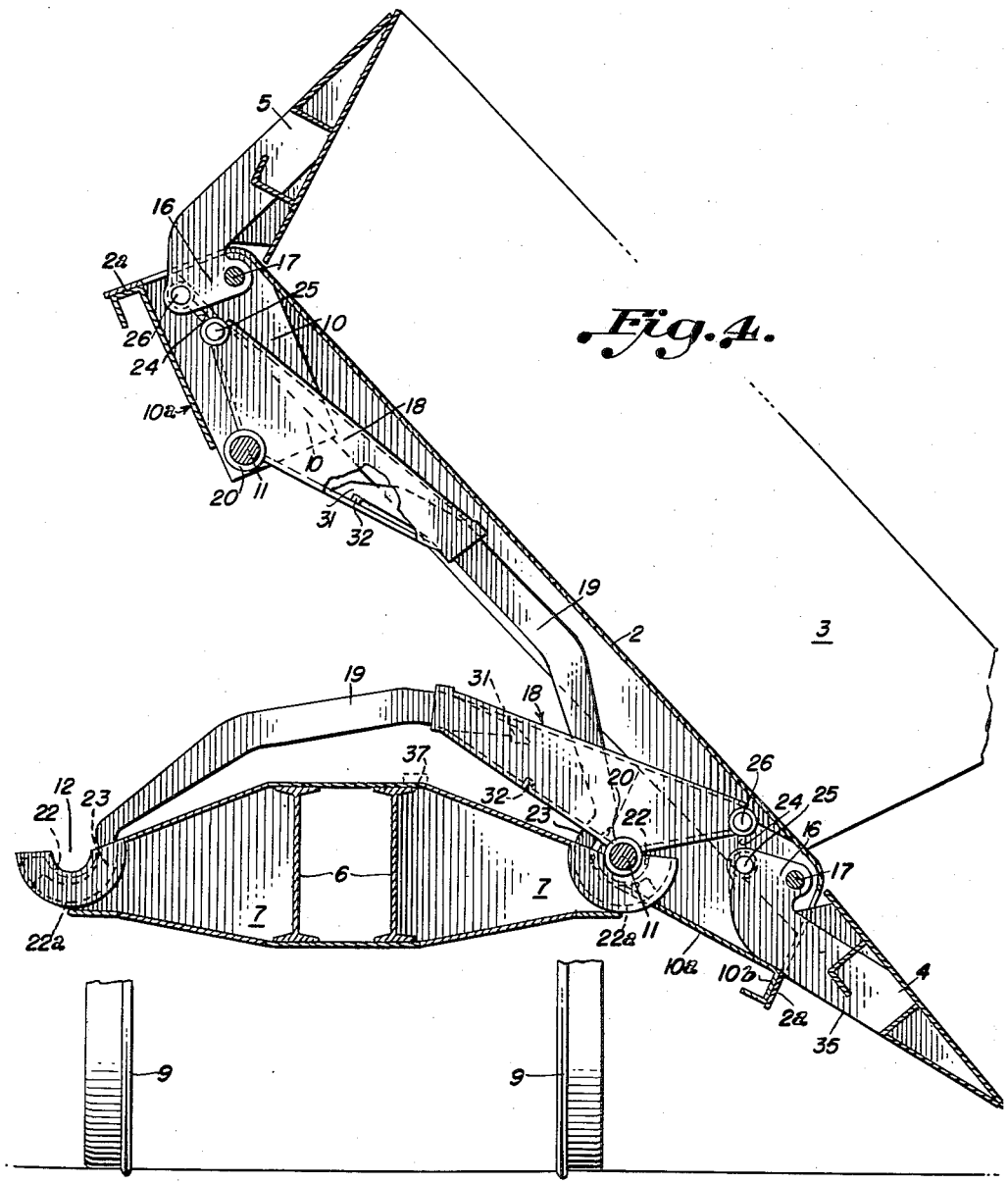

March 18, 1958  H. F. FLOWERS  2,826,999
DUMP VEHICLE INTERLOCKING DOOR MECHANISM
Filed June 4, 1954  6 Sheets-Sheet 5
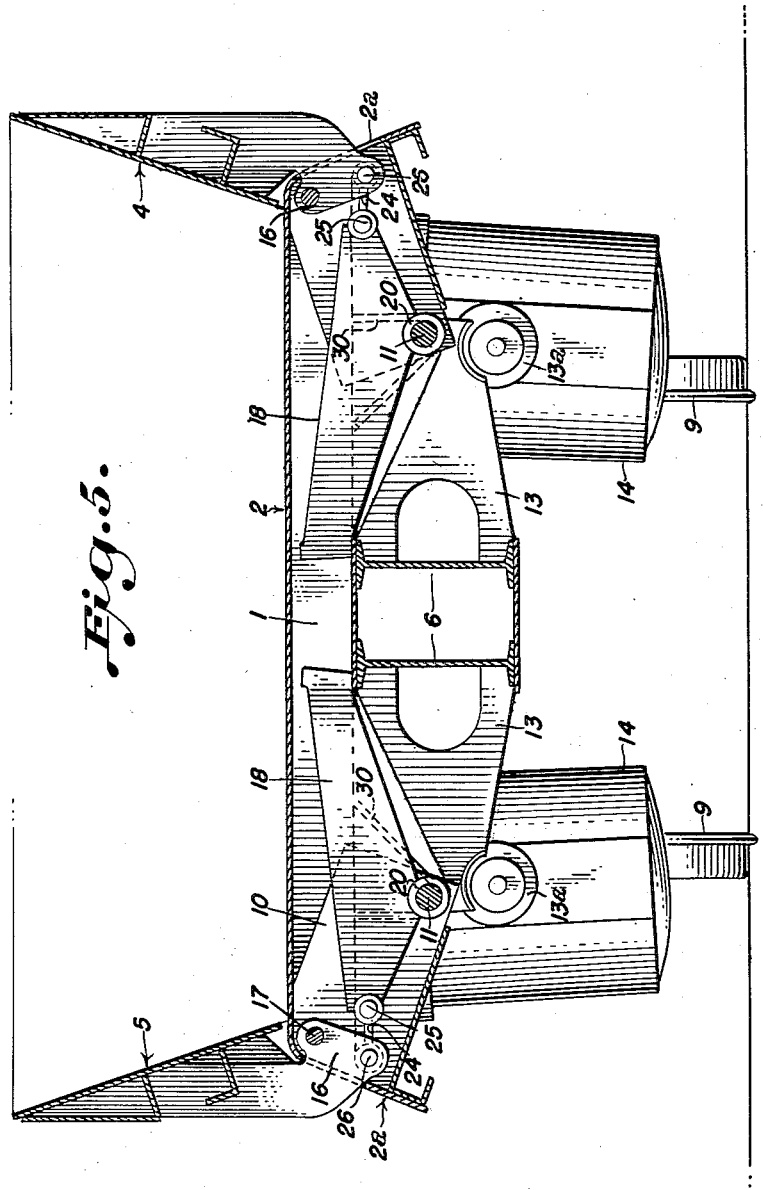
INVENTOR.
HENRY FORT FLOWERS
BY
Mason, Porter, Diller & Stewart
ATTYS.

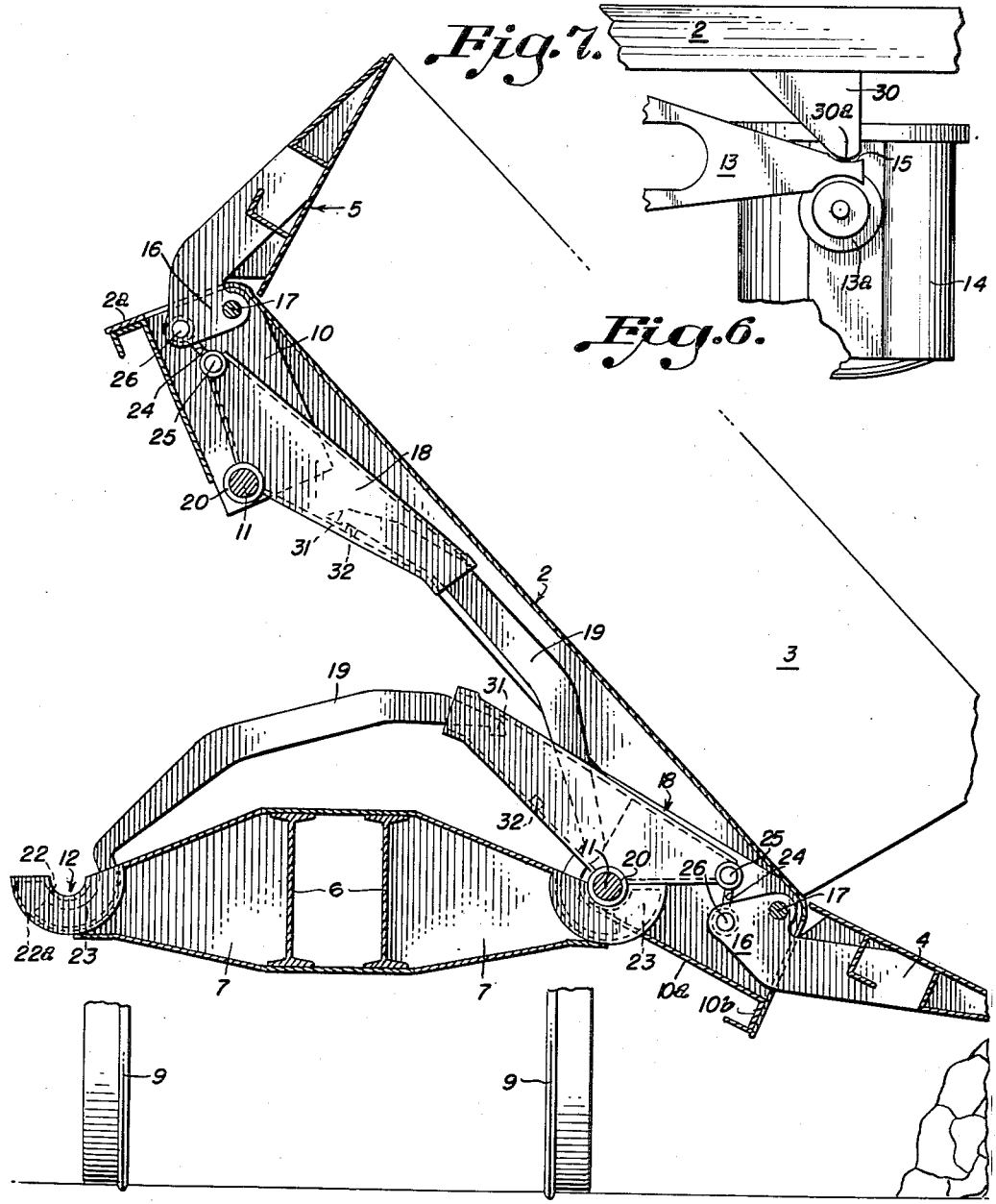

United States Patent Office 2,826,999
Patented Mar. 18, 1958

2,826,999

DUMP VEHICLE INTERLOCKING DOOR MECHANISM

Henry Fort Flowers, Findlay, Ohio

Application June 4, 1954, Serial No. 434,593

7 Claims. (Cl. 105—277)

This invention relates to new and useful improvements in a door controlling mechanism for a dump vehicle of the type shown in the patent granted Henry Fort Flowers May 14, 1940, No. 2,200,271. In said patent there is shown a dump vehicle mounted on trunnions for selective dumping to one side or the other. There is a downwardly folding door at each side of the body and a control mechanism for controlling the movement of the door to open position as the body is tilted for dumping, and this control mechanism also holds the door at the elevated side closed.

The door controlling mechanism of said patent includes a main control arm and an auxiliary control arm both of which are pivoted to the same trunnion and said control arms are in abutted engagement during loading, transporting and during the tilting of the body for moving the door to open position.

An object of the present invention is to provide a door controlling mechanism for a dump vehicle of the above type which is adapted for fabrication by welding from steel plates, bars, tubes and the like.

Another object is to provide a door controlling mechanism for a dump vehicle of the above type in which the door controlling mechanism includes telescoping and interlocking cross arms to simplify assembly of the vehicle and to reduce to a minimum the mechanical parts required.

A further object of the invention is to provide a door controlling mechanism which is so constructed that the door is moved to full open position before the body has completed its tilting movement and wherein the interlocking connection between the door controlling devices is automatically released to permit the body to be tilted to a further extent for dumping after a door has moved to full open position.

A still further object of the invention is to provide a door controlling mechanism that is so constructed that if the door strikes an obstruction the interlocking connection in the door controlling mechanism is automatically released so that the door can move toward closed position while the body continues its tilting movement.

A still further object of the invention is to provide a door controlling mechanism that can be easily adjusted to take up wear and keep the doors firmly in closed position during transport.

These and other objects will be apparent from the following description of the preferred form of the invention as illustrated by way of example in the accompanying drawings in which:

Figure 3 is a transverse sectional view on line 3, 3 of Figure 1 and showing the main door controlling mechanism in side elevation;

Figure 4 is a view similar to Figure 3 but showing the body tilted to full dumping position;

Figure 5 is a sectional view on the line 5, 5 of Figure 1;

Figure 6 is a view similar to Figure 4, but showing the door as having contacted an obstruction and the continued tilting of the body to fully dumping position and Figure 7 is a fragmentary view showing one of the body rockers contacting one of the brackets supporting the outer cylinder and thus serving to support the body.

Figure 1:
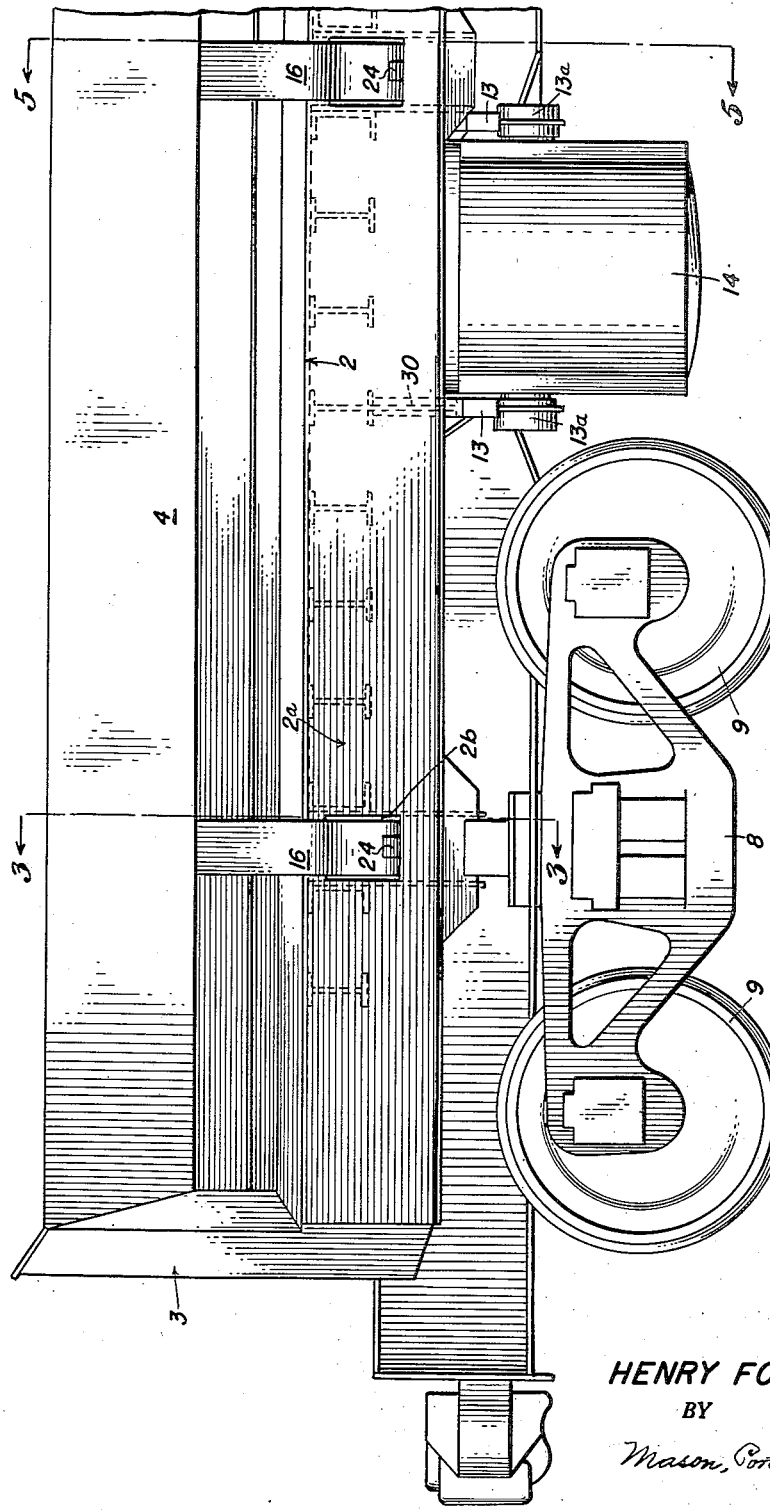
Figure 1 is a side view of a portion of a dump vehicle embodying the improvements.

Referring to the illustrated embodiment of the invention, the dump vehicle includes a body 1 having cross beams on which is mounted a floor plate 2. At the end of the body are end members 3 mounted in any suitable way. Also mounted at each side of the body is a downwardly folding door which doors are indicated as 4 and 5 respectively.

The underframe on which the body is mounted consists of a center sill 6 formed of sheet metal plates welded together. Extending from this center sill are laterally projecting bolsters 7, 7 which are formed of steel plates welded together. The body is mounted on these bolsters so that it can be tilted selectively about fulcrums at opposite sides of the underframe. The underframe is in turn supported on a truck frame 8 having supporting wheels 9, 9 which may be constructed for travel on rails or for travel on any desired road bed construction.

Depending from the floor beams at each side of the body are body supporting plates 10. These plates are welded to the beams and are connected by a pin 11 which serves as a fulcrum on which the body tilts during dumping. The bolsters 7 are provided with U-shaped bearings 12 which serve as fulcrum supports for the body when the body is tilted and which also serve as supports for the body during loading and transport.

Projecting laterally from the center sills 6 are power cylinder supporting members 13, 13. These members may be constructed in any suitable way and carry trunnion supports 13ª, 13ª for the power cylinders indicated at 14, 14. There are power cylinders at each side of the under frame and these power cylinders are provided with the usual lifting pistons which in turn are connected to the body so that the body may be raised selectively at one side or the other for dumping the contents thereof. The power cylinders and the manner of mounting and operating the same form no part of the present invention.

Referring to Figure 3, the floor 2 of the body is provided with a depending skirt 2ª which is secured to the depending plates 10. There is a cross plate 10ª connecting the plates 10, 10 and welded to the skirt 2ª. There is also provided a skirt angle bar reenforcement 10ᵇ. The door 4 is provided with a series of hinge brackets 16. Said hinge brackets are mounted on pivot pins 17 carried by the floor beams. The skirt 2ª is slotted as indicated at 2ᵇ in Figure 1 to permit the hinge brackets to extend beneath the floor 2.

At each bolster there are independent door controlling devices for the doors. These door controlling devices are similar in construction and a detailed description of one will answer for the others. Each door controlling device includes a main door controlling lever or arm 18. A sleeve 20 is welded to the door controlling lever 18 and is dimensioned so as to lie between the plates 10, 10. There are openings in the plates 10, 10 and the fulcrum pin 11 passes through these openings and through the sleeve.

On the outer side of the plates are sleeves 29, 29 welded thereto for reenforcing the plates and the fulcrum pin passes through the plates and into these reenforcing sleeves. The sleeve 20 is free to turn on the fulcrum pin at the side of dumping. This sleeve 20 engages the U-shaped bearing 12 and serves as a fulcrum support for the body when the body is tilted. The sleeve 20 rests in the bearing 12 and the fulcrum pin 11 is supported by the sleeve, and the body plates 10, 10, with the reenforcing sleeves 29, turn on the fulcrum pin when the body is tilted. The body turns about the center of these fulcrum pins 11 when it is tilted. When the body is in normal position for loading or transport these fulcrum pins, through the sleeve 20, engage the bolsters and support the body.

The door operating lever or arm 18 is mounted on the fulcrum pin at one side of the body and extends across to rest on the underframe at the center beam 6. This door operating lever is preferably fabricated by welding from steel plates and a tubing, and has a rectangular cross section with side plates, top, and bottom cover plates.

Associated with this door controlling arm 18 is an auxiliary controlling arm 19 which is preferably cut from steel plate. This cross arm 19 is connected to the underframe at the opposite side of the body. The bolster member 7 is provided with an arcuate shaped housing, the wall 22 of which is curved about the center of the fulcrum pin 11 and provides the bearing 12 in which the sleeve 20 normally rests. The bolster has a lower wall 22ª which is also curved about the same center as the upper wall. These walls 22 and 22ª serve to guide the end of the auxiliary arm 19 which is curved as indicated at 23. This curved end 23 extends into the bolster housing and makes sliding contact therewith at the dumping side when the body is tilted. This maintains the connection between the auxiliary arm and the underframe. It permits the door operating lever for the door at the elevated side to remain in a fixed position relative to the body while the door operating lever 18 for the door at the dumping side remains in a fixed position relative to the underframe until the door is fully open. In order to provide a positive connection between the body and the underframe during transport the auxiliary control arm 19 is provided with a hooked end 31 which fits over a block 32 attached to the bottom cover plate of the main door controlling lever 18. This interlock between the auxiliary and the main control arms for the door also serves to hold the door at the elevated side firmly closed.

After the body has been tilted to a position where the door is fully opened, the interlocking connection between the auxiliary control arm and the main control arm is automatically released. This happens because the door is in full open position and further movement will turn the main control arm in a clockwise direction about the fulcrum pin 11. Furthermore, when the door is being opened by the tilting of the body if it strikes an obstruction the door can move towards closed position. This movement of the door towards closed position will turn the main control arm so as to automatically release the interlocking connection and this will permit the main control arm to move away from the underframe. In other words, this continued tilting of the body after the door strikes an obstruction releases this interlocking means and permits the door to move toward closed position. The door controlling lever 18 is connected to the door with which it is associated by means of the link 24. The link is pivoted at 25 to the control lever 18 and is pivoted at 26 to the door bracket hinge.

When the body is in normal position for loading and for transport the doors are held in closed position. When the body is tilted the door controlling arm or lever 18 for the door at the dumping side remains in a fixed position relative to the underframe and as the body turns about the center of the fulcrum pins the opening of the door will be positively controlled. Each door hinge has an outer edge 35 which comes into contact with the cross plate 10ª thereby limiting the turning movement of the door relative to the body. At this time the inner face of the door is substantially in alinement with the floor plate. The door controlling mechanism is preferably so constructed that the door hinge 16 contacts the cross plate 10ª when the body is moved through an angle of approximately 35 degrees. The body, however, can continue its tilting movement for the reason that the door controlling lever 18 can rotate about the center of the fulcrum pin 11. The advantage of opening the door fully before the body completes its tilting movement is that some of the material will slide out at such angle and the vehicle will be more stable when the body is fully tilted to permit the free flow of the material as soon as it tends to slip on the floor.

When the body is tilted for dumping, the plate 10ª moves around the end of the bolster 7 as shown in Figures 4 and 6 and the plate will therefore prevent the body from being lifted from its fulcrum support when in tilted or near tilted position.

Figure 2:
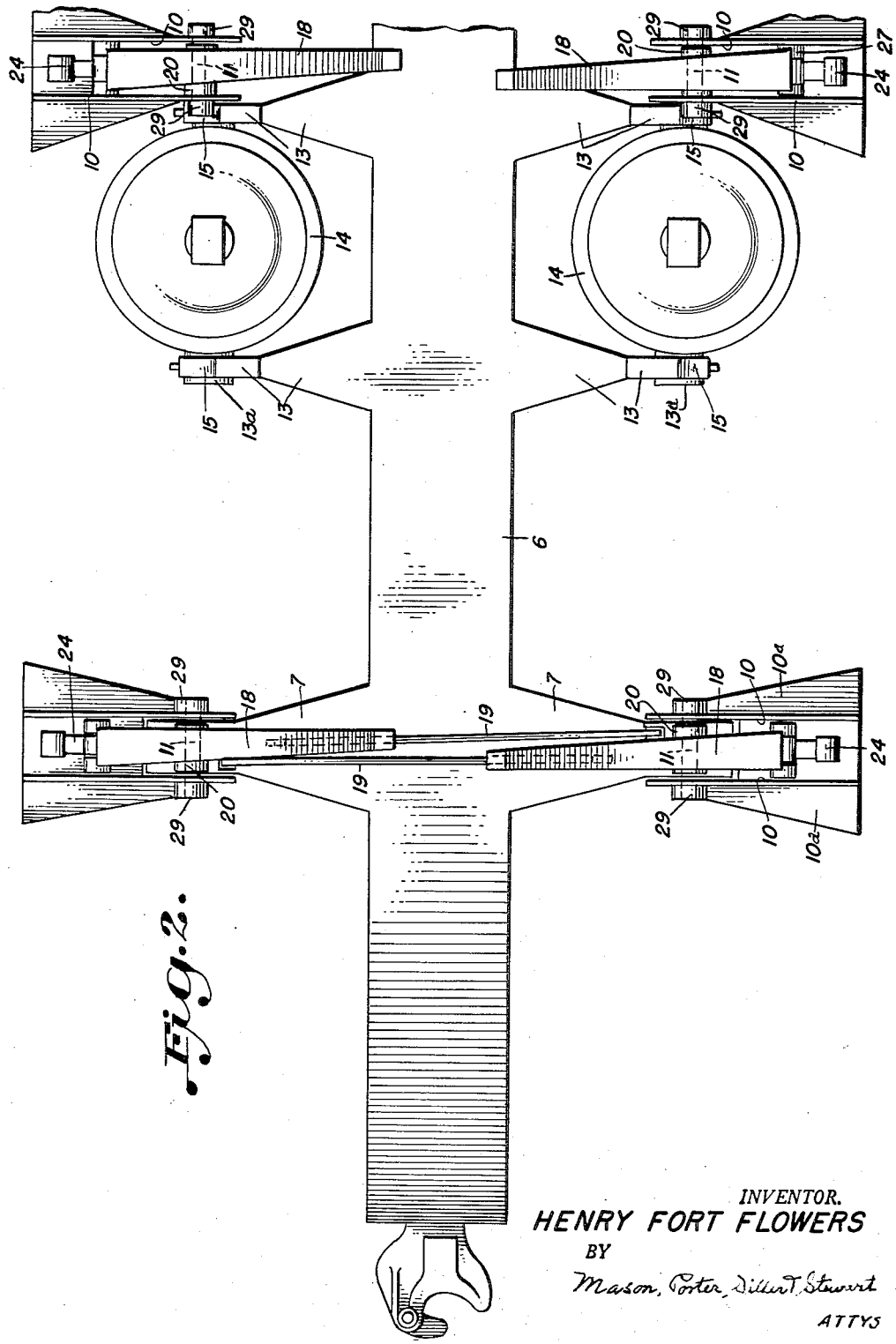
Figure 2 is a view in plan showing more or less diagrammatically the underframe including the center sill, bolsters, supports for the power cylinders, the door controlling mechanism with the floor plate, doors and floor beams removed.

The main door controlling devices described above in detail are disposed at the bolsters. There are also auxiliary door controlling devices of a similar character disposed at positions along the body between the two main door controlling devices. These intermediate controlling devices are shown in Figures 1, 2 and 5. They are disposed adjacent the power cylinders 4. These intermediate door controlling devices are of the same mechanical parts as the door controlling devices at the bolsters except that the auxiliary arm 19 is omitted. Each auxiliary device includes door plates 10, 10 which are welded to the floor beams 2. The main door controlling arm 18 has a sleeve 20 welded thereto. A fulcrum pin 11 passes through the sleeve and through the plates 10, 10 into the reenforcing sleeves 29 which are welded to the outer faces of the plates 10, 10. There is no bolster associated with these auxiliary door controlling devices and no bearing for receiving the sleeve 20.

This auxiliary controlling device terminates at the center beam and bears thereagainst. The door has a hinge section 16 and is pivoted at 17 to the cross beam 2 of the body. A link 24 is pivoted at 25 to the auxiliary door control arm 18 and is pivoted at 26 to the door. As clearly shown in Figure 2 the reenforcing sleeve 29 on the body plate 10 adjacent the power cylinder contacts the power cylinder supporting members 13, 13 and thus the body is supported by these members 13, 13 during transport and at the side of dumping. When the body is tilted for dumping it turns about the fulcrum pin 11 and during this tilting movement the auxiliary lever 18 remains in a fixed position relative to the underframe and this controls the opening of the door. These auxiliary control devices function precisely as the door controlling devices at the bolsters. If the door should strike an obstruction the auxiliary door controlling arm 18 will move away from the center sill in a counter-clockwise direction and this will permit the door to move towards closed position. These door controlling devices not only control the opening of the door and holding of the doors closed during transport, but they also serve to support the body through the reenforcing sleeve 29 contacting the upper face of the end portion of the power cylinder supporting member 13.

An additional body supporting member may be employed. Such a body supporting member is disposed on the opposite side of the power cylinder from that of the auxiliary door controlling member. In Figure 7 there is shown more or less diagrammatically a body rocker 30 which consists of plates joined by cross plates and these plates are welded to the floor beams and depend therefrom. This body rocker is disposed directly above the supporting member 13 for the power cylinders. The end of the supporting member is curved slightly at 15 and the rounded nose 30ª of the body rocker contacts said curved surface 15. This is purely an extra body support and does not function in any way for controlling the opening of the doors. When the body is tilted the rocker at the dumping side will have a rolling contact with the curved surface on the bracket supporting the power cylinder.

As wear occurs on the door mechanical parts the doors will tend to sag slightly open during loading and transport. To compensate for this wear it is necessary only to weld or otherwise attach a shim 37 of suitable thickness to the top of the center sill 6 at the point at which the door controlling lever 18 makes contact. This method of adjustment is shown in Figure 4. It is simple and positive and not rendered inoperative by wear and corrosion effects.

From the above it will be apparent that an improved door controlling mechanism has been provided which holds the doors closed during loading and during transport. The door controlling devices also hold the door closed at the elevated side and controls the opening and closing of the door at the dumping side. This control mechanism is so constructed that if the door strikes an obstruction during opening it can move towards closed position while the body continues to tilt. Furthermore, the controlling devices for the doors include a main door controlling device and an auxiliary door controlling device which have interlocking connection so that the body during transport is firmly held against lateral movement and the doors are firmly held in tightly closed position. This interlocking connection also serves to hold the door firmly closed at the elevated side while the door at the dumping side is controlled in its opening movement as the body tilts.

The auxiliary door controlling mechanisms disposed intermediate the bolsters cooperate with the controlling mechanism at the bolsters in holding the doors closed during loading and transport and controlling the opening and closing of the door at the dumping side. These intermediate auxiliary controlling devices, however, do not hold the door closed at the elevated side. This is accomplished solely by the controlling mechanism at the bolsters.

It is obvious that many changes in the details of construction may be made without departing from the spirit of the invention as set forth in the appended claims.

I claim:

1. In a dumping vehicle, an underframe having fulcrum supports at opposite sides thereof, a dump body having trunnions adapted to engage the fulcrum supports on which trunnions said dump body may be tilted for dumping, a down folding door at each side of said body, stops for limiting the opening movement of each door, independent door controlling devices for each door including a main control arm pivotally connected to the body at one of its trunnions, a link connecting one end of said main arm to the adjacent side door, said main arm having a free inner end, and an auxiliary control arm engaging the fulcrum support on the opposite side of the underframe, said auxiliary control arm having a fulcrum coaxial with said underframe fulcrum support and having a free inner end, said inner ends telescoping at a point intermediate the said fulcrum supports.

2. In a dumping vehicle, an underframe having fulcrum supports at opposite sides thereof, a dump body having trunnions engaging the fulcrum supports on which trunnions said dump body may be tilted for dumping, a down folding door at each side of said body, stops for limiting the opening movement of each door, independent door controlling devices for each door including a main control arm pivotally connected to the body at one of its trunnions, a link connecting one end of said main arm to the adjacent side door, said main arm having a free inner end, and an auxiliary control arm engaging the fulcrum support on the opposite side of the underframe, said auxiliary control arm having a fulcrum coaxial with said underframe fulcrum support and having a free inner end, said inner ends telescoping at a point intermediate the said fulcrum supports, said main arm at its inner end engaging the underframe when the body is in normal position for loading and transport for holding the doors closed and for controlling the opening and closing of the door when the body is tilted.

3. In a dumping vehicle, an underframe having fulcrum supports at opposite sides thereof, a dump body having trunnions engaging the fulcrum supports on which trunnions said dump body may be tilted for dumping, a down folding door at each side of said body, stops for limiting the opening movement of each door, independent door controlling devices for each door including a main control arm pivotally connected to the body at one of its trunnions, a link connecting one end of said main arm to the adjacent side door, said main arm having a free inner end, and an auxiliary control arm engaging the fulcrum support on the opposite side of the underframe, said auxiliary control arm having a fulcrum coaxial with said underframe fulcrum support and having a free inner end, said inner ends telescoping at a point intermediate the said fulcrum supports, said main arm at its inner end engaging the underframe when the body is in normal position for loading and transport for holding the doors closed and coacting with said auxiliary arm for controlling the opening and closing of the door when the body is tilted, said main arm being movable away from the underframe at its free end to permit further tilting movement of the body after the door is in full open position.

4. In a dumping vehicle, an underframe having fulcrum supports at opposite sides thereof, a dump body having trunnions engaging the fulcrum supports on which trunnions said dump body may be tilted for dumping, a down folding door at each side of said body, stops for limiting the opening movement of each door, independent door controlling devices for each door including a main control arm pivotally connected to the body at one of its trunnions, a link connecting the outer end of said main arm to the adjacent side door, said main arm having a free inner end, and an auxiliary control arm engaging the fulcrum support on the opposite side of the underframe, said auxiliary control arm having a fulcrum coaxial with said underframe fulcrum support and having a free inner end telescoping within the inner end of the main arm at a point intermediate the said fulcrum supports, said main control arm at its inner end engaging the underframe during loading and transport and during the opening movement of the door, said main arm being movable away from the underframe at its free end to permit further tilting movement of the body after the door is in full open position, and means for locking said auxiliary arm against endwise movement in the main arm during loading, transport and the opening movement of the door.

5. In a dumping vehicle, an underframe having fulcrum supports at opposite sides thereof, a dump body having trunnions engaging the fulcrum supports on which trunnions said dump body may be tilted for dumping, a down folding door at each side of said body, stops for limiting the opening movement of each door, independent door controlling devices for each door including a main control arm pivotally connected to the body at one of its trunnions, a link connecting the outer end of said main arm to the adjacent side door, said main arm having a free inner end, and an auxiliary control arm engaging the fulcrum support on the opposite side of the underframe, said auxiliary control arm having a fulcrum coaxial with said underframe fulcrum support and having a free inner end telescoping within the inner end of the main arm at a point intermediate the said fulcrum supports, said main control arm at its inner end engaging the underframe during loading and transport and during the opening movement of the door, said main arm being movable away from the underframe at its free end to permit further tilting movement of the body after the door is in full open position, and means for locking said auxiliary arm against endwise movement in the main arm during loading, transport and the opening movement of the door, said locking means being automatically released to permit the inner end of the main arm to move away from the underframe when the door strikes an obstruction.

6. In a dumping vehicle, an underframe having fulcrum supports at opposite sides thereof, a dump body having trunnions engaging the fulcrum supports on which trunnions said dump body may be tilted for dumping, a down folding door at each side of said body, stops for limiting the opening movement of each door, independent door controlling devices for each door including a main control arm pivotally connected to the body at one of its trunnions, a link connecting the outer end of said main arm to the adjacent side door, said main arm having a free inner end, and an auxiliary control arm engaging the fulcrum support on the opposite side of the underframe, said auxiliary control arm having a fulcrum coaxial with said underframe fulcrum support and having a free inner end telescoping within the inner end of the main arm at a point intermediate the said fulcrum supports, said main control arm at its inner end engaging the underframe during loading and transport and during the opening movement of the door, said main arm being movable away from the underframe at its free end to permit further tilting movement of the body after the door is in full open position, and means for locking said auxiliary arm against endwise movement in the main arm during loading, transport and the opening movement of the door, said locking means being automatically released to permit the main arm to move away from the underframe when the door strikes an obstruction, and a shim disposed on said underframe beneath the inner free end of the main control arm for supporting the telescoped ends of the arms and for varying the contacting position of said main control arm to take up wear.

7. In a dumping vehicle, an underframe having fulcrum supports at opposite sides thereof, a dump body having trunnions engaging the fulcrum supports on which trunnions said dump body may be tilted for dumping, a downfolding door at each side of said body, stops for limiting the opening movement of each door, independent door controlling devices for each door including a main control arm pivotally connected to the body at one of its trunnions, a link connecting the outer end of said main arm to the adjacent side door, said main arm having a free inner end, and an auxiliary control arm engaging the fulcrum support on the opposite side of the underframe, said auxiliary control arm having a fulcrum coaxial with said underframe fulcrum support and having a free inner end telescoping within the inner end of the main arm at a point intermediate the said fulcrum supports, said main control arm at its inner end engaging the underframe during loading and transport and during the opening movement of the door, said main control arm being movable away from the underframe at its free end to permit further tilting movement of the body after the door is in full open position, said main control arm having parallel side plates and top and bottom plates welded to the side plates, a holding block attached to the bottom plate, said auxiliary control arm having a laterally projecting lug engaging said block when the main control arm is in engagement with the underframe for holding the door closed at the elevated side and for preventing lateral movement of the body during transport.

References Cited in the file of this patent
UNITED STATES PATENTS

| | | |
|---|---|---|
| 1,867,844 | Jungerson | July 19, 1932 |
| 1,965,097 | Cartzdafner | July 3, 1934 |
| 2,200,271 | Flowers | May 14, 1940 |